(12) United States Patent
Hodge et al.

(10) Patent No.: US 9,785,596 B2
(45) Date of Patent: Oct. 10, 2017

(54) REDUNDANT SYSTEM BOOT CODE IN A SECONDARY NON-VOLATILE MEMORY

(71) Applicant: HEWLETT-PACKARD DEVELOPMENT COMPANY, L.P., Houston, TX (US)

(72) Inventors: Richard H Hodge, Houston, TX (US); Jeffrey Kevin Jeansonne, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 195 days.

(21) Appl. No.: 14/780,929

(22) PCT Filed: Apr. 23, 2013

(86) PCT No.: PCT/US2013/037725
§ 371 (c)(1),
(2) Date: Sep. 28, 2015

(87) PCT Pub. No.: WO2014/175862
PCT Pub. Date: Oct. 30, 2014

(65) Prior Publication Data
US 2016/0055113 A1    Feb. 25, 2016

(51) Int. Cl.
*G06F 9/44* (2006.01)
*G06F 13/40* (2006.01)
(Continued)

(52) U.S. Cl.
CPC ........ *G06F 13/4027* (2013.01); *G06F 3/0613* (2013.01); *G06F 3/0656* (2013.01); *G06F 3/0683* (2013.01); *G06F 9/4406* (2013.01); *G06F 11/1417* (2013.01); *G06F 13/4022* (2013.01); *G06F 21/575* (2013.01); *G06F 11/2094* (2013.01)

(58) Field of Classification Search
None
See application file for complete search history.

(56) References Cited

U.S. PATENT DOCUMENTS 6,223,336 B1    4/2001    Tojima
7,193,895 B2    3/2007    Jin et al.
(Continued)

FOREIGN PATENT DOCUMENTS

| CN | 101965570 | 2/2011 |
| TW | 480444 | 3/2002 |

(Continued)

OTHER PUBLICATIONS

"TMS320C31 Embedded Control", < http://www.ti.com/lit/an/spru083/spru083.pdf >, Feb. 1998.
(Continued)

*Primary Examiner* — Cheng-Yuan Tseng
(74) *Attorney, Agent, or Firm* — Trop, Pruner & Hu

(57) ABSTRACT

A controller determines whether system boot code stored in a first non-volatile memory is compromised and non-recoverable. In response to determining that the system boot code is compromised and non-recoverable, switch logic is activated to connect a second non-volatile memory to the shared bus and to disconnect the first non-volatile memory from the shared bus.

15 Claims, 3 Drawing Sheets

(51) Int. Cl.
*G06F 21/57* (2013.01)
*G06F 3/06* (2006.01)
*G06F 11/14* (2006.01)
*G06F 11/20* (2006.01)

(56) References Cited

U.S. PATENT DOCUMENTS

| | | | |
|---|---|---|---|
| 7,340,595 | B2 | 3/2008 | Blinick et al. |
| 7,613,872 | B2 | 11/2009 | Dayan et al. |
| 8,086,841 | B2 * | 12/2011 | Guo .................. G06F 9/4401 711/102 |
| 8,190,950 | B2 | 5/2012 | Chen et al. |
| 8,732,527 | B2 * | 5/2014 | Tabone .............. G06F 11/1417 713/1 |
| 2008/0072030 | A1 | 3/2008 | Karpa |
| 2009/0240934 | A1 * | 9/2009 | Chou .................. G06F 11/1417 713/2 |
| 2009/0248955 | A1 | 10/2009 | Tamada |
| 2010/0070800 | A1 | 3/2010 | Hanna |
| 2010/0115187 | A1 | 5/2010 | Wu et al. |
| 2010/0115256 | A1 | 5/2010 | Challener et al. |
| 2013/0047031 | A1 | 2/2013 | Tabone et al. |

FOREIGN PATENT DOCUMENTS

| | | |
|---|---|---|
| TW | I280487 | 5/2007 |
| TW | 2010/07465 A | 2/2010 |
| TW | 201133342 A | 10/2011 |

OTHER PUBLICATIONS

Jeansonne el al., International Application No. PCT/US13/37724 entitled Recovering From Compromised System Boot Code filed Apr. 23, 2013 (29 pages).

Jeansonne et al., International Application No. PCT/US13/37727 entitled Configuring a System filed Apr. 23, 2013 (35 pages).

Jeansonne et al., International Application No. PCT/US13/37728 entitled Event Data Structure to Store Event Data filed Apr. 23, 2013 (36 pages).

Jeansonne et al., International Application No. PCT/US13/37729 entitled Repairing Compromised System Data in a Non-Volatile Memory filed Apr. 23, 2013 (25 pages).

Jeansonne et al., International Application No. PCT/US13/37733 entitled Retrieving System Boot Code From a Non-Volatile Memory filed Apr. 23, 2013 (26 pages).

Jeansonne et al., International Application No. PCT/US13/37735 entitled Verifying Controller Code and System Boot Code filed Apr. 23, 2013 (36 pages).

* cited by examiner

REDUNDANT SYSTEM BOOT CODE IN A SECONDARY NON-VOLATILE MEMORY

BACKGROUND

A computing system can include code to perform various startup functions of the computing system. This code can include Basic Input/Output System (BIOS) code. BIOS code can be the subject of attacks by malware in the computing system or from an external service. As a result of an attack, the BIOS code can become compromised.

BRIEF DESCRIPTION OF THE DRAWINGS

Some implementations are described with respect to the following figures.

DETAILED DESCRIPTION

Figure 1:
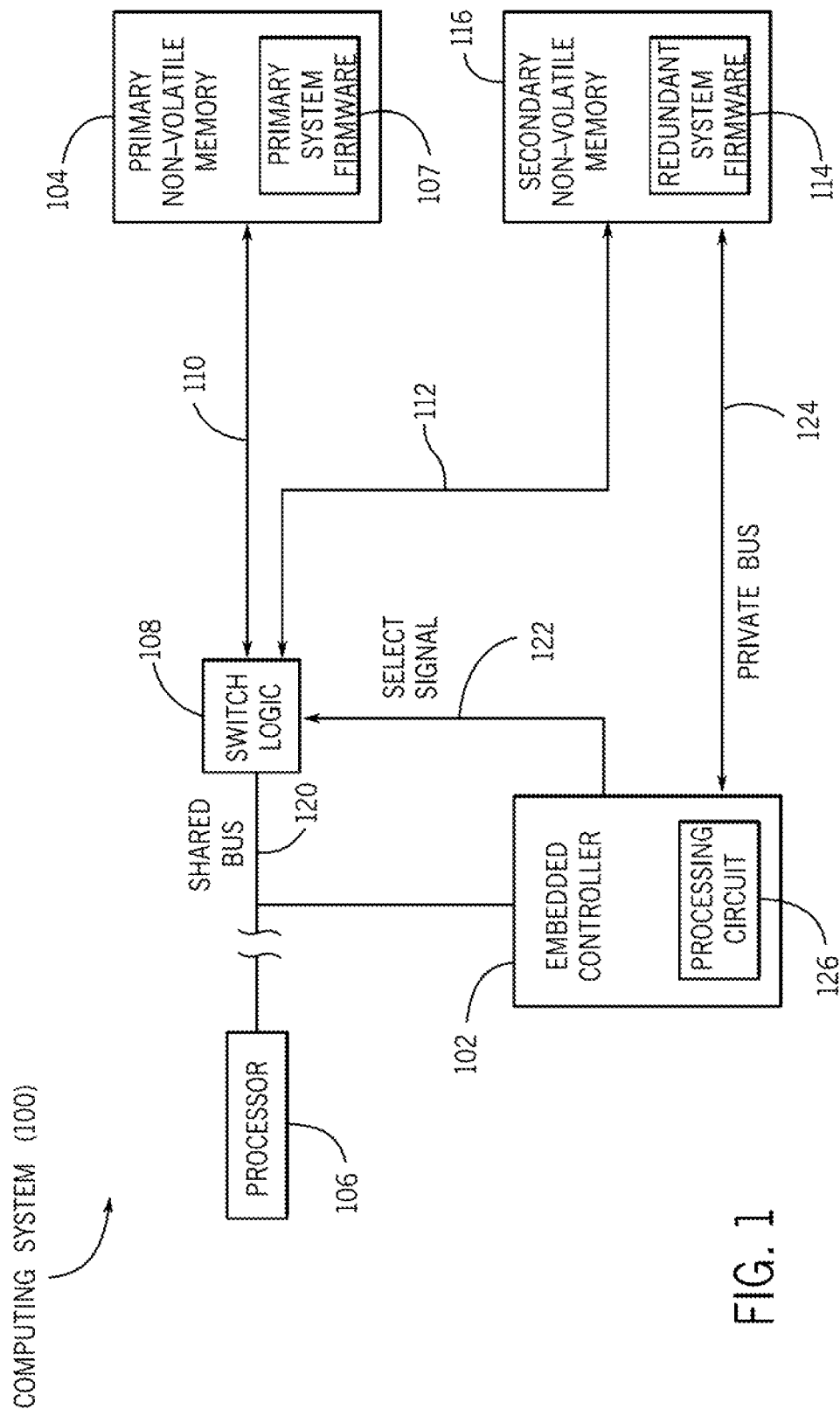
FIG. 1 is a block diagram of an example system according to some implementations.

Malware attacks on system code used to perform startup of a computing system can cause the integrity of the computing system to be compromised such that unauthorized access and operations in the computing system can occur. For example, compromised system code can allow covert remote monitoring and/or control of the computing system by a malicious entity, unauthorized access and/or modification of data in the computing system by malware, disablement of the computing system, and so forth. Compromised system code can refer to system code that has been corrupted such that the system code is no longer usable, or alternatively, compromised system code can refer to system code that has been changed in some way but that is still able to execute. Note that system code can also be compromised accidentally or intentionally.

Although a protection mechanism can be provided in a computing system to protect the system code, such protection mechanism may become compromised under certain conditions, which can subject the system code to malware attacks.

System code used to perform startup of a computing system can include system firmware, which can be in the form of machine-readable instructions executable on a processor (or processors) of the computing system. "System firmware" can cover any machine-readable instructions that are able to perform startup of a computing system. Examples of computing systems include desktop computers, notebook computers, tablet computers, personal digital assistants (PDAs), smartphones, game appliances, server computers, storage nodes, network communication nodes, and so forth.

System firmware can include Basic Input/Output System (BIOS) code, which can initialize various components of the computing system, and load an operating system (OS) of the computing system. The BIOS code can perform checking of hardware components to ensure that the hardware components are present and functioning properly. This can be part of a power-on self-test (POST) procedure, for example. After the POST procedure, the BIOS code can progress through the remainder of a booting sequence, after which the BIOS code can load and pass control to the OS. BIOS code can include legacy BIOS code or Unified Extensible Firmware Interface (UEFI) code. In some examples, the BIOS code can include a runtime portion that is executed after the OS loads.

The system firmware can be stored in non-volatile memory, such as a flash memory or any other persistent memory that is programmable. Once system firmware in a non-volatile memory is compromised, one possible remediation may involve physically replacing a component that includes the non-volatile memory. Such a technique of addressing compromised system firmware can be labor-intensive, costly, and time-consuming.

In accordance with some implementations, a secondary non-volatile memory can be provided that is in addition to a primary non-volatile memory that stores a primary version of the system firmware. The secondary non-volatile memory can store a redundant version of the system firmware. If the system firmware in the primary non-volatile memory becomes compromised, then the system firmware in the secondary non-volatile memory can be used instead.

In the ensuing discussion, although reference is made to "system firmware," it is noted that techniques or mechanisms can be applied to other types of system boot code, where system boot code can refer to any code that can boot a computing system after restart or can resume the computing system from a low power state.

FIG. 1 is a block diagram of an example computing system 100 that includes an embedded controller 102, a primary non-volatile memory 104, a processor 106, and a secondary non-volatile memory 116. The primary non-volatile memory 104 can store a primary version of system firmware (referred to as "primary system firmware" 107), which can include BIOS code. The secondary non-volatile memory 106 can store a redundant version of the system firmware (referred to as "redundant system firmware" 114), The redundant system firmware 114 may be an identical copy of the primary system firmware 107, or alternatively, the redundant system firmware 114 may be different from the primary system firmware 107 (for example, the redundant system firmware 109 can be an earlier or later version of the system firmware).

The secondary non-volatile memory 116 can be physically separate from the primary non-volatile memory 104 (such as implemented as different physical memory devices). Alternatively, the primary non-volatile memory 104 and the secondary non-volatile memory 116 can physically reside on a common memory device, but the primary non-volatile memory 104 and the secondary non-volatile memory 116 are in different segments of the physical memory device.

A switch logic 108 is also provided to selectively connect one of the primary non-volatile memory 104 and secondary non-volatile memory 116 to a shared bus 120. The shared bus 120 is accessible by the embedded controller 102 and the processor 106. Although not shown in FIG. 1, an input/output (I/O) controller may be provided between the processor 106 and the shared bus 120.

The switch logic 108 is connected over a first link 110 to the primary non-volatile memory 104, and over a second link 112 to the secondary non-volatile memory 116. The switch logic 108 is controlled by a select signal 122 from the embedded controller 102.

In some examples, the switch logic 108 can be a multiplexer/demultiplexer. If the select signal 122 is at a first state, then the switch logic 108 connects the shared bus 120 and the first link 110, such that the primary non-volatile memory 104 is accessible over the shared bus 120. If the select signal 122 is at a second, different state, then the switch logic 108 connects the shared bus 120 and the second link 112, such that the secondary non-volatile memory 116 is accessible over the shared bus 120.

When accessible over the shared bus, the connected one of the primary and secondary non-volatile memories 104 and 116 is a shared non-volatile memory. The non-volatile memory is "shared" in the sense that it is accessible by multiple entities, including the embedded controller 102 and at least one other entity (including the processor 106).

The other non-volatile memory that is not connected by the switch logic 108 to the shared bus 120 is inaccessible over the shared bus 120. In some examples, the secondary non-volatile memory 116 can be connected to the embedded controller 102 over a private bus 124. The private bus 124 can be used by the embedded controller 102 to copy the redundant system firmware 114 (and system data) to the secondary non-volatile memory 116 during provisioning of the computing system 100 (such as at the factory or at a service site).

In other examples, the private bus 124 is omitted.

In some implementations, the default configuration of the computing system 100 can be one where the switch logic 108 is controlled by the embedded controller 102 to connect the primary non-volatile memory 144 to the shared bus 120, while the secondary non-volatile memory 116 is isolated from the shared bus 120 by the switch logic 108. In the default configuration, the primary system firmware 107 is retrievable by the processor 106 and can be executed on the processor 106 to perform system boot or resume.

In the default configuration, if the private bus 124 is provided, the secondary non-volatile memory 116 is accessible by the embedded controller 102, but is inaccessible to the processor 106 or to other components in the computing system 100. Making the secondary non-volatile memory 116 inaccessible to the processor 106 and other components in the default configuration protects the content of the secondary non-volatile memory 116 from unauthorized tampering.

In response to detecting that the primary system firmware 107 is compromised, the embedded controller 102 can perform various actions. First, in some implementations, the embedded controller 102 attempts to recover from the compromised system firmware 107 in the primary non-volatile memory 104 by copying the redundant system firmware 114 from the secondary non-volatile memory 116 to the primary non-volatile memory 104, to replace the compromised system firmware 107 with the redundant system firmware 114.

However, in some cases, it may be possible that an error or fault in the computing system 100 (such as a physical fault of the primary non-volatile memory 104 or physical fault of the link 110) may prevent the recovery of the system firmware 107 in the primary non-volatile memory 104. In fact, the error or fault in the computing system 100 may have contributed to the detection of compromise of the primary system firmware 107. In such cases, as a failsafe technique, the state of the select signal 122 can be changed to connect the secondary non-volatile memory 116 to the shared bus 120, and to isolate the primary non-volatile memory 104 from the shared bus 120. Such a configuration can be referred to as a "secondary configuration." In the secondary configuration, the redundant system firmware 114 is retrievable by the processor 106 and can be executed on the processor 106.

The embedded controller 102 may detect that the recovery of the compromised system firmware 107 is not possible if the embedded controller 102 determines that the embedded controller 102 is unable to successfully write the redundant system firmware 114 to the primary non-volatile memory 104, such as due to fault of the primary non-volatile memory 104 or the link 110. Alternatively, the embedded controller 102 may detect that the recovery of the compromised system firmware 107 is not possible if the embedded controller 102 performs a recovery operation (to copy the redundant system firmware 114 to the primary system firmware 107), and following this recovery operation, the embedded controller 102 again detects that the primary system firmware 107 is still compromised.

In some implementations, just one entity can have access to the shared bus 120 at any given time, such that just one entity can access the shared non-volatile memory (the one of the primary and secondary non-volatile memories that is connected to the shared bus 120) at a time. In some examples, the shared bus 120 is a shared Serial Peripheral Interface (SPI) bus. An SPI bus is a synchronous serial data link in which devices on the SPI bus operate in a master-slave mode. In other examples, another type of shared bus 120 can be used. In alternative examples, an arbitration mechanism can be provided to allow for shared access of the bus 120 in various states of the computing system, including a low power state and a normal runtime state.

In some examples, the system firmware 107 or 114 can include a boot block. The boot block is a part of the BIOS code, and is first executed when the computing system 100 starts up. The boot block is executed first before the rest of the BIOS code is allowed to execute. The boot block can be used to check the integrity of the BIOS code as well as to perform other initial functions. If the boot block confirms the integrity of the BIOS code, then the boot block can pass control to the main portion of the BIOS code for initiating the remaining operations associated with the BIOS code.

In some implementations, the boot block can include core root of trust for measurement (CRTM) logic, which is logic specified by the Trusted Computing Group (TCG), an industry standard work group. During a power on procedure of the computing system 100, the CRTM logic can perform certain initialization tasks and can make a number of measurements that are stored for later use. The CRTM logic can then check the BIOS code before passing control to the main portion of the BIOS code. Once the BIOS code completes execution and passes control to the OS, the OS can verify the trustworthiness of the computing system 100 based on measurements taken by the CRTM logic.

The embedded controller 102 is physically separate from the processor 106 of the computing system 100. The processor 106 is used for executing the OS, application code, and other code in the system 100. The embedded controller 102, on the other hand, can be used to perform specific predefined tasks. Examples of tasks that can be performed by the embedded controller 102 include any one or some combination of the following: power supply control in the computing system 100 (for controlling a power supply that supplies power supply voltages to various components in the computing system 100), charging and control of a battery in the computing system 100, thermal monitoring (to monitor a temperature in the computing system 100), fan control (to control a fan in the computing system 100), and interaction with a user input device (such as performing a scan of a keyboard of the computing system 100 or interaction with a pointing device such as a mouse, touchpad, touchscreen, and so forth). The embedded controller 102 can be implemented with a microcontroller, an application-specific integrated circuit (ASIC), a programmable gate array (PGA), or any other type of programmable circuit.

The embedded controller 102 includes a processing circuit 126 that is able to perform the specified tasks of the embedded controller 102. The processing circuit 126 includes hardware circuitry. In some examples, the processing circuit 126 can execute machine-readable instructions, such as in the form of an embedded controller firmware (EC firmware) or other controller code. Note that the EC firmware may be initially stored in the primary or secondary non-volatile memory 104 or 116, and can be loaded into the embedded controller 102 for execution. Alternatively, it is noted that controller code executable on the embedded controller 102 can alternatively be application software that can be in the form of machine-readable instructions. In the ensuing discussion, although reference is made to "EC firmware," it is noted that techniques or mechanisms can be applied to other forms of the controller code 108.

Figure 2:
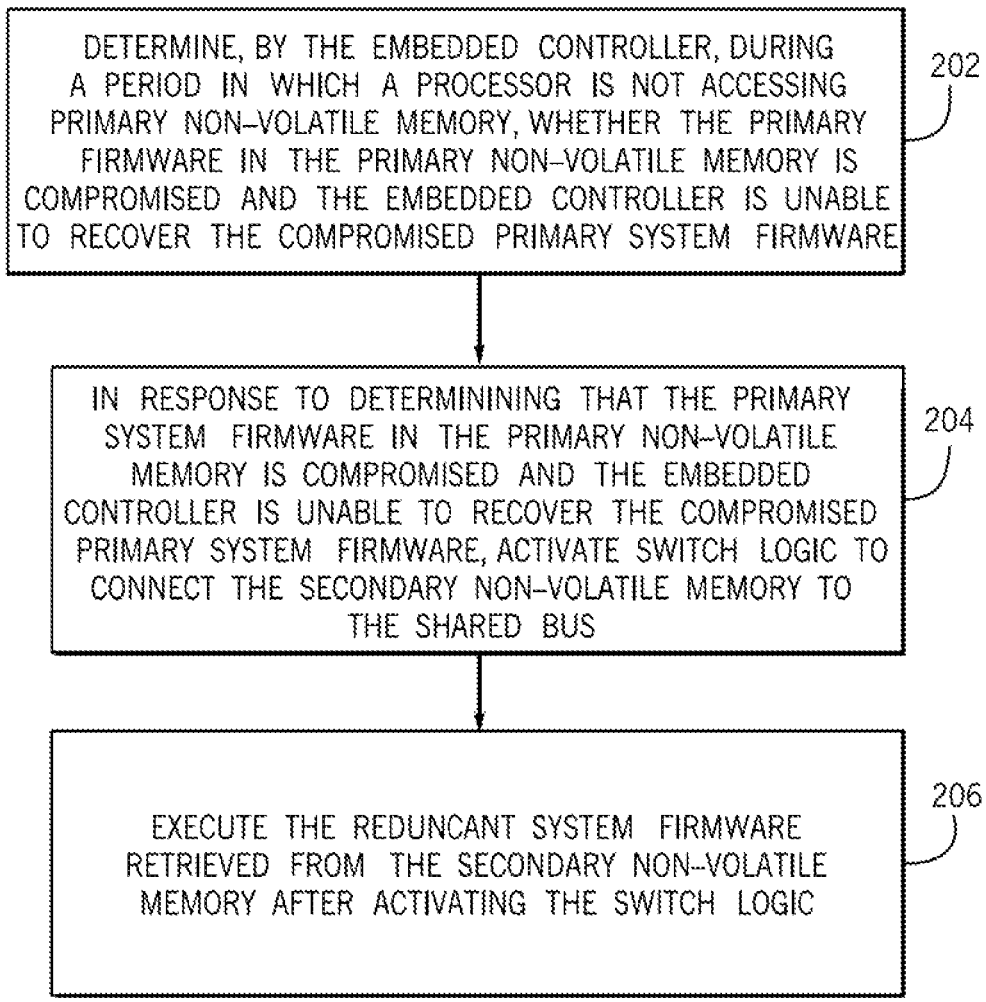
FIG. 2 is a flow diagram a system boot code recovery process according to some implementations.

FIG. 2 is a flow diagram of a process according to some implementations. The processing circuit 126 in the embedded controller 102 determines (at 202), during a period in which the processor 106 is not accessing the primary non-volatile memory 104 (such as due to the processor 106 being disabled or otherwise being idle), whether the primary system firmware 107 stored in the primary non-volatile memory 104 is compromised and the embedded controller 102 is unable to recover the compromised primary system firmware 107 (as discussed above). The processor 106 being disabled refers to the processor 106 being in a powered off state (no power is provided to the main processing part of the processor 106) or in a reset state (e.g. a reset signal to the processor 106 is asserted that prevents the processor 106 from executing machine-readable instructions).

In response to determining that the primary system firmware 107 is compromised and un-recoverable, the processing circuit 126 changes the state of the select signal 122 to activate (at 204) the switch logic 108 to connect the secondary non-volatile memory 116 to the shared bus 120 and to disconnect the primary non-volatile memory 104 from the shared bus 120.

Upon connection by the switch logic 108 to the shared bus 120, the secondary non-volatile memory 116 becomes accessible by the processor 106, which can retrieve the redundant system firmware 114 from the secondary non-volatile memory 116 for execution (at 206) at the processor 106. By being able to perform the switch from the primary non-volatile memory 104 to the secondary non-volatile memory 116, a user is allowed to continue to use the computing system 100 despite the primary system firmware 107 being unusable.

Subsequently, the user can be warned that there has been a failure that prevented use of the primary system firmware 107 in the primary non-volatile memory 104, and that the computing system is currently running the redundant system firmware 114 in the secondary non-volatile memory 116. A service event should be scheduled to address this condition. While running in this condition, the computing system does not have the additional level of protection against compromise of the system firmware that is provided when the secondary non-volatile memory 116 provides the redundant system firmware to the primary system firmware in the primary non-volatile memory 104. As a result, there may be a risk that the computing system may become disabled if the system firmware in the secondary non-volatile memory 116 becomes compromised (since there is no redundancy at this point).

The determination (at 202) of whether system firmware has been compromised can be based on performing verifying of the system firmware. Verifying a piece of code, such as the system firmware, can refer to cryptographically validating that the piece of code has not been changed and/or confirming that the piece of code is from a trusted source.

The verifying of the system firmware can be performed by the embedded controller 102 prior to each instance of restarted execution of the system firmware (from the primary or secondary non-volatile memory) by the processor 106, such as due to a cold reset of the computing system 100, a resume from a low power state of the computing system 100, an operating system restart, and so forth. It is noted that the system firmware can also be verified by the embedded controller 102 each time the computing system 100 enters a low power state. In other examples, the embedded controller 102 can also verify the system firmware when the processor 106 remains powered.

A low power state of the computing system 100 refers to a state of the computing system 100 in which the processor 106 and certain other hardware components of the system 100 are off (e.g. no power is provided to the main processing part of the processor and certain other hardware components). In the low power state power can still be provided to the embedded controller 102. The computing system 100 can transition to a low power state in any of the following scenarios: (1) as part of a cold reset of the computing system 100 that caused the system 100 to be powered off for subsequent power on, or (2) as part of a power savings procedure, in which the computing system 100 can transition from a normal operating state to a sleep state, hibernation state, or an off state after a time period of inactivity, or in response to detecting a low battery condition, or in response to user or application command, or for another reason, or (3) in any other scenario.

Examples of low power states can include certain Advanced Configuration and Power Interface (ACPI) states, including: the ACPI S3 state (which is a form of a standby or sleep state in which the system context of the computing system 100 is maintained in volatile memory that remains powered while some components of the computing system 100 are powered off); the ACPI S4 state (which is a form of hibernation state in which the system context is saved to persistent storage to allow power to be removed from additional computing system components, including volatile memory); and the ACPI S5 state (which is a form of system off state, in which power has been removed from even more components of the computing system 100).

In further examples, the embedded controller 102 can perform verification of the system firmware in response to a warm reset of the computing system 100, in which a computing system 100 is restarted without removing power to the computing system 100. To allow the embedded controller 102 to perform the verification in response to the warm reset, the computing system 100 can be forced to transition to an appropriate low power state (such as certain ones of the low power states listed above) when the warm reset is detected.

In other examples, the embedded controller 102 can perform the verification at any time, even when the computing system is not in a low power state. For example, the embedded controller 102 can perform the verification when the processor is idle or not accessing the primary nonvolatile memory 104. The verification by the embedded controller 102 can also be performed in "real-time," as the system firmware is retrieved for execution by the processor.

Figure 3:
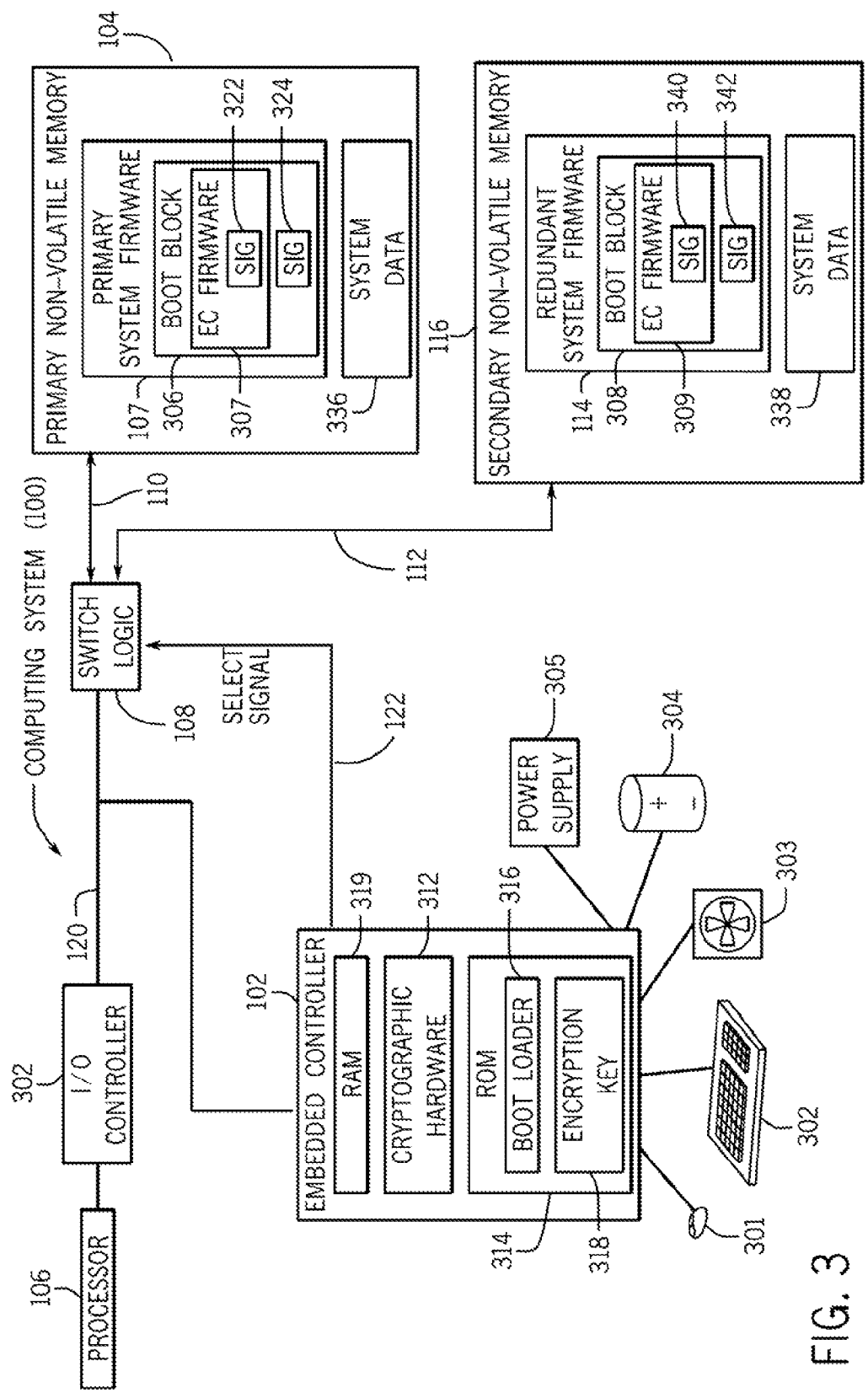
FIG. 3 is a block diagram of another example system according to further implementations.

FIG. 3 is a block diagram of a computing system 100 according to further implementations. The computing system 100 of FIG. 3 includes an input/output (I/O) controller 302, which is connected between the processor 106 and the shared bus 120. In some examples, the I/O controller 302 can be a Platform Controller Hub (PCH) from Intel Corporation. The PCH can include various functions, including a display interface to a graphics subsystem, a system bus interface to a system bus to which various I/O devices can be connected, and so forth. In other examples, other types of I/O controllers can be used.

As depicted in FIG. 3, the embedded controller 102 is coupled to a user input device 301 (e.g. a mouse device or other type of input device), a keyboard 302, a fan 303, a battery 304, and a power supply 305, to manage the respective devices (under control of EC firmware executing in the embedded controller 102). The EC firmware executing in the embedded controller 102 can be loaded from the primary or secondary non-volatile memory 104 or 116.

In some examples, the system firmware 107 in the primary non-volatile memory 104 includes a boot block 306. The boot block 306 can include EC firmware 307. In other examples, the EC firmware 307 can be separate from the system firmware 107. Similarly, the secondary system firmware 114 in the secondary non-volatile memory 116 includes a boot block 308 and EC firmware 309.

In the FIG. 3 example, the embedded controller 102 includes cryptographic hardware 312, which can perform cryptographic computations, such as those used in the verifying of EC firmware and system firmware. The cryptographic hardware 312 can be in the form of circuitry that is configured to perform cryptographic computations.

The embedded controller 102 further includes a read-only memory (ROM) 314, which can be used to store a boot loader 316 and an encryption key 318. The encryption key 318 can be the key (public key or private key) used to perform verification of the EC firmware (307 or 309). During system startup, the boot loader 316 is loaded from the ROM 314 to execute in the embedded controller 102 to retrieve EC firmware from the primary or secondary non-volatile memory 104 or 116 into a random access memory (RAM) 319 of the embedded controller 102. The boot loader 316 can take steps to ensure that no other entity except the embedded controller 102 has access he shared bus 120 during the EC firmware load operation.

To retrieve an EC firmware for loading into the embedded controller 102, the boot loader 316 can find a pointer (or other reference) to an EC firmware image, which can be stored in the primary or secondary non-volatile memory 104 or 116.

The retrieved EC firmware is verified by verification logic in the embedded controller 102, where the verification logic can include functionality in the boot loader 316 that is able to invoke the cryptographic hardware 312 to assist in performing cryptographic computations.

The verification of the EC firmware retrieved from a non-volatile memory (104 or 116) can be performed during an initialization procedure of the embedded controller 102. An initialization procedure of the embedded controller 102 refers to a procedure that is performed when the embedded controller 102 first starts after the embedded controller 102 has been reset or after a power cycle of the embedded controller 102 (where power is removed from and then re-applied to the embedded controller 102).

Once the EC firmware is verified and loaded for execution on the embedded controller 102, the EC firmware can verify system firmware (107 or 114 prior to each restarted execution of the system firmware by the processor 106.

In the primary non-volatile memory 104, a signature 322 is associated with the EC firmware 108, and a signature 324 is associated with the boot block 306. Similarly, in the secondary non-volatile memory 116, a signature 340 is associated with the EC firmware 309, and a signature 342 is associated with the boot block 308. The signature 322 or 340 is used in the verification of the respective EC firmware 307 or 309, while the signature 340 or 342 is used in the verification of the respective boot block 306 or 308. Use of a signature in the verification process can allow a determination of the authenticity of the respective EC firmware or boot block, and a determination that the respective EC firmware or boot block has not been compromised.

In some implementations, the verification of the EC firmware 307 or 309 can be accomplished by decrypting the respective signature 322 or 340 using the encryption key 318 stored in the embedded controller ROM 314. Decrypting the signature produces a respective value (e.g. hash value) that can be compared with a corresponding calculated value (e.g. hash value) of the EC firmware. If the foregoing values match, then the EC firmware is verified. A similar process can be used for verifying the BIOS boot block 306 or 308 using the respective digital signature 324 or 342.

Each of the primary and secondary non-volatile memories 104 and 116 can also store system data 336 or 338 that relates to configuration of various aspects of the computing system 100. For example, the system data 336 or 338 can include machine unique data, network interface controller data, layout descriptor data, and so forth.

The network interface controller data can include configuration data of a network interface controller (that is used to perform communications over a network). The layout descriptor data can include information that describes a layout of the primary and secondary non-volatile memories 104 and 116, and configuration parameters for the I/O controller 302.

The machine unique data can refer to any data or settings that are unique to each particular computing system. Examples of machine unique data can include any or some combination of the following: product name, product model, stock-keeping unit (SKU) number (for identifying the respective computing system for sale), a serial number of the computing system, a system or commodity tracking number (for identifying a system board of the computing system), a system configuration identifier (for identifying a configuration of the computing system), warranty data (for describing a warranty associated with the computing system), a universally unique identifier (UUID), a default setting of BIOS code, and so forth. The foregoing is provided as examples of machine unique data in other examples, other or additional types of machine unique data can be provided.

By using techniques or mechanisms according to some implementations, a computing system is able to continue operation even in the event of a system fault or error that prevents recovery of the system firmware in the primary non-volatile memory. The ability to continue operation does not have to involve manual intervention by a human.

Machine-readable instructions, such as those executable in the embedded controller 102 or the processor 106 can be loaded from a machine-readable or computer-readable storage medium for storage media).

The storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of, an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A controller for use in a system, comprising:
   a processing circuit to:
      determine whether system boot code stored in a first non-volatile memory is compromised and non-recoverable, wherein the first non-volatile memory is initially accessible over a shared bus by the controller and a processor, and
      in response to determining that the system boot code is compromised and non-recoverable, activate switch logic to connect a second non-volatile memory to the shared bus and to disconnect the first non-volatile memory from the shared bus, wherein the second non-volatile memory upon connection by the switch logic to the shared bus is accessible by the processor to retrieve redundant system boot code from the second non-volatile memory.

2. The controller of claim 1, wherein prior to activating of the switch logic to connect the second non-volatile memory to the shared bus, the second non-volatile memory is isolated from the shared bus.

3. The controller of claim 1, wherein after activating of the switch logic to connect the second non-volatile memory to the shared bus, the first non-volatile memory is isolated from the shared bus.

4. The controller of claim 1, wherein the determining of whether the system boot code is compromised is performed upon entry of the system into a low power state or prior to each instance of restarting of the system boot code at the processor, wherein the controller has read-only memory storing a cryptographic key.

5. The controller of claim 4, wherein the determining of whether the system boot code is compromised uses a cryptographic key at the controller.

6. The controller of claim 1, wherein the controller is an embedded controller.

7. The controller of claim 1, wherein the determining of whether the system boot code is compromised includes determining whether a boot block is compromised.

8. The controller of claim 1, further comprising controller code that upon execution in the controller causes the controller to perform at least one selected from among: power supply control in the system, thermal monitoring in the system, fan control in the system, battery charging and control in the system, and interaction with a user input device.

9. The controller of claim 1, further comprising verification logic to verify controller code stored in the first or second non-volatile memory.

10. The controller of claim 9, wherein the processing circuit is to load the controller code from the first non-volatile memory in response to the verifying, and wherein the controller code is executable on the processing circuit to perform the determining and the activating.

11. A system comprising:
   a processor;
   a bus;
   switch logic connected to the bus;
   a first non-volatile memory to store primary system boot code;
   a second non-volatile memory to store redundant system boot code, wherein the switch logic initially is to connect the first non-volatile memory to the bus, and wherein the processor initially has access to the primary system boot code over the bus;
   an embedded controller to:
      determine whether the primary system boot code stored in he first non-volatile memory is compromised and non-recoverable; and
      in response to determining that the primary system boot code is compromised and non-recoverable, activate the switch logic to connect the second non-volatile memory to the bus and to disconnect the first non-volatile memory from the bus, wherein the second non-volatile memory upon connection by the switch logic to the bus is accessible by the processor to retrieve the redundant system boot code from the second non-volatile memory for execution on the processor.

12. The system of claim 11, wherein the primary system boot code includes at least a part of a basic input/output system (BIOS) code.

13. The system of claim 11, wherein the embedded controller is to determine that the system boot code is compromised during a time period in which the processor is not accessing the first non-volatile memory.

14. The system of claim 11, wherein each of the first and second non-volatile memories are to further store system data relating to configuration of aspects of the system.

15. A method comprising;
   determining, by a controller, whether system boot code stored in a first non-volatile memory is compromised and non-recoverable due to a physical failure in a system, wherein the first non-volatile memory is initially accessible by the controller and a processor over a shared bus, and wherein the system further includes a second non-volatile memory that is initially a private non-volatile memory accessible by the controller and inaccessible by the processor;
   in response to determining that the system boot code in the first non-volatile memory is compromised and non-recoverable, activating switch logic to connect the second non-volatile memory to the shared bus and to disconnect the first non-volatile memory from the shared bus; and
   executing system boot code retrieved from the second non-volatile memory on the processor after the activating of the switch logic.

* * * * *

UNITED STATES PATENT AND TRADEMARK OFFICE
CERTIFICATE OF CORRECTION

PATENT NO. : 9,785,596 B2
APPLICATION NO. : 14/780929
DATED : October 10, 2017
INVENTOR(S) : Hodge et al.

It is certified that error appears in the above-identified patent and that said Letters Patent is hereby corrected as shown below:

On the Title Page

In Column 1, Item (72), Inventors, delete "Richard H Hodge" and insert -- Richard H. Hodge --, therefor.

In the Drawings

FIG. 2, Ref. 206, delete "REDUNCANT" and insert -- REDUNDANT --, therefor.

In the Claims

In Column 9, Line 30, in Claim 1, delete "processor," and insert -- processor; --, therefor.

In Column 10, Line 24, in Claim 11, delete "he" and insert -- the --, therefor.

In Column 10, Line 46, in Claim 15, delete "comprising;" and insert -- comprising: --, therefor.

Signed and Sealed this
Twentieth Day of February, 2018

Andrei Iancu
*Director of the United States Patent and Trademark Office*